United States Patent [19]
Harsdorf et al.

[11] 3,855,479
[45] Dec. 17, 1974

[54] RAY DIAGNOSIS APPARATUS

[75] Inventors: Jobst V. Harsdorf; Edgar Tschunt, both of Erlangen, Germany

[73] Assignee: Siemens Aktiengesellschaft, Erlangen, Germany

[22] Filed: Apr. 12, 1971

[21] Appl. No.: 132,997

Related U.S. Application Data

[63] Continuation-in-part of Ser. No. 788,722, Jan. 3, 1969, abandoned.

[52] U.S. Cl............. 250/369, 128/2 A, 346/33 ME
[51] Int. Cl............................ G01t 1/20, A61b 6/00
[58] Field of Search................. 128/2 A, 2 R, 2 V; 73/67.8, 71.5; 346/33 ME, 139 B; 250/71, 71.5, 83.3, 369

[56] References Cited
UNITED STATES PATENTS

| | | | |
|---|---|---|---|
| 2,776,377 | 1/1957 | Anger | 250/71 |
| 3,070,695 | 12/1962 | Stickney et al. | 250/71.5 |
| 3,116,416 | 12/1963 | Reed | 250/53 |
| 3,234,386 | 2/1966 | Leventhal et al. | 250/83.3 |
| 3,247,709 | 4/1966 | Gordon | 73/67.8 |
| 3,308,652 | 3/1967 | Appel et al. | 73/71.5 |
| 3,322,954 | 5/1967 | Bell et al. | 250/209 |
| 3,465,145 | 9/1969 | Leiter | 250/71.5 |
| 3,483,565 | 12/1969 | Jaffe et al. | 346/33 |
| 3,418,471 | 12/1968 | Gydesen | 250/71.5 |

*Primary Examiner*—Kyle L. Howell
*Attorney, Agent, or Firm*—Richards & Geier

[57] ABSTRACT

A ray diagnosis apparatus or scanner has a ray measuring probe which is screened against the rays and which is guided as feeler line by line over the section being examined. A writing element is moved synchronously therewith over a writing material. The apparatus has adjusting means so that the writing will correspond to the measured results. The invention is particularly characterized by the provision of adjusting means which control jointly several values which are dependent from each other in the view of getting an optimal inscription.

3 Claims, 4 Drawing Figures

INVENTORS:
Jobst v. Harsdorf and Edgar Tschunt
By Richards & Geier
ATTORNEYS

RAY DIAGNOSIS APPARATUS

This application is a continuation-in-part of our copending patent application, Ser. No. 788,722, filed Jan. 3, 1969, now abandoned.

This invention relates to a ray diagnosis apparatus or scanner which has a measuring probe protected against the rays and which acn be guided as a feeler line by line over the section being examined. The apparatus also includes a writing implement synchronized with the probe and movable over a sheet of writing material. The apparatus also has adjusting means to adapt the inscriptions to the results of measurements. Apparatus of this type is used particularly for medical diagnosis to investigate thyroid glands and other organs or effects of illnesses, such as tumors which, as is well known, accumulate radioactive substances introduced into the body.

During the testing of the body range being examined, the impulse rate varies depending upon the distribution and concentration of the radioactive substance in the body, therefore, in order to produce the best possible inscriptions, it is advisable to utilize the writing output of the inscribing device as fully as possible for the range of activity being measured, bearing in mind that this writing output cannot exceed a predetermined number of inscriptions per time unit. It is therefore necessary at the beginning of the examining operation to find in the section being measured the place corresponding to the greatest concentration of the rays. Prior art scanners were applied to calculate and set the adjusted values for the visible steps on the basis of this measurement. This requires, however, the adjustment and setting of many values in order to obtain an optimal representation, such as the number of inscriptions per writing length, dependent upon the impulse rate and examining speed, while taking into consideration the average statistical compensation in the statement of information contained in the inscription.

An object of the present invention is to improve prior art devices.

Other objects will become apparent in the course of the following specification.

In accordance with the present invention the measured result and the inscription space are adapted to each other in that the available adjusting means are used for jointly controlling several values which are dependent from each other. The adjusting means can be coupled with each other.

The inscribing of an isotope image received by the scanner depends upon the magnitude of the receiving impulse rate $n$ and the speed $v$ of adjusting and inscribing. As is well known, the inscribed image in each case should have the greatest density of coloring for the maximal rate to be reproduced in the examination. In the case of inscriptions produced by printed markings it is necessary to have a certain number of markings per millimeter of the writing space line, for example, three traces to provide the greatest color density. In a photoscriber wherein the effect of light flashes upon photosensitive layers is utilized, the density is also dependent upon adjustment speed. Since the distribution of color density must indicate the density of the rays being measured, there also exists a dependency upon the impulse rate to be inscribed. It is, therefore, advantageous to couple the adjustment of the impulse rate $n$ with an adjustment of the space available for inscriptions, and the adjustment of the testing speed $v$ with the setting of writing frequency.

The values of the impulse rate $n$ and of the testing speed $v$ are in certain ways dependent upon each other, in that the quotient $n/v$ constitutes a measure for the statistical compensation and thus for the information supplied by the inscription. It is advantageous, therefore, to combine the adjusting means for $n$ and $v$ through a quotient producer. The quotient can be provided then with an indication for the statistical compensation. On the other hand, it is also possible to use this indication in order to limit the statistical compensation to a maximum value. This limits the representation to cases wherein they still supply useful information. The value $n/v$ is also suitable to adapt the duration of the flash in photographic inscriptions to the testing. The illumination depends upon its duration in the specific part of the sensitive layer and thus the value $n/v$ provides the possibility of obtaining a comparable blackening of the photographic material for all $n$ and $v$ combinations, since the required balance is provided by this connection.

A device of the present invention which is particularly advantageous due to its comparatively simple structure is produced when the measured impulse rate is transformed by the use of a rate meter into a voltage which is logarithmically dependent therefrom. This voltage can then be adapted in a compensation amplifier to the best possible operation of the various parts of the apparatus. For compensation purposes the compensation voltage is supplied to the amplifier by means of a potentiometer. The logarithmic value of the compensation voltage can be also used as the basis for producing the quotient $n/v$. If the logarithmic value for the testing speed $v$, namely $\log v$, is subtracted from $\log n$, the logarithm of $n/v$ is obviously produced. The subtraction can be simply carried out with any desired electrical or mechanical means. Suitable is a differential drive which has driving means adjustable for $n$ as well as for $v$. After adjustment, a value can be obtained at the outlet of the drive which corresponds to $v/v$.

The logarithmic values are again converted to ordinary ones for operating the inscribing means. When adjusting the speed and also when producing $n/v$, the conversion can be carried out by an arrangement of contacts of resistances the values of which, after a logarithmic turning of the driving shaft, will produce corresponding simple delogarithmized values of resistances. In the case of a voltage of a normed average value produced by $n$ setting, the change from logarithmic to simple values can be effected through diodes connected in parallel, which are mirror-like subjected to voltage opposed to the applied logarithmic voltage. The compensated measuring voltage is transformed into a corresponding number of indicia to produce the inscribed markings.

The invention will appear more clearly from the following detailed description when taken in connection with the accompanying drawing, showning by way of example only, a preferred embodiment of the inventive idea.

Figure 1:
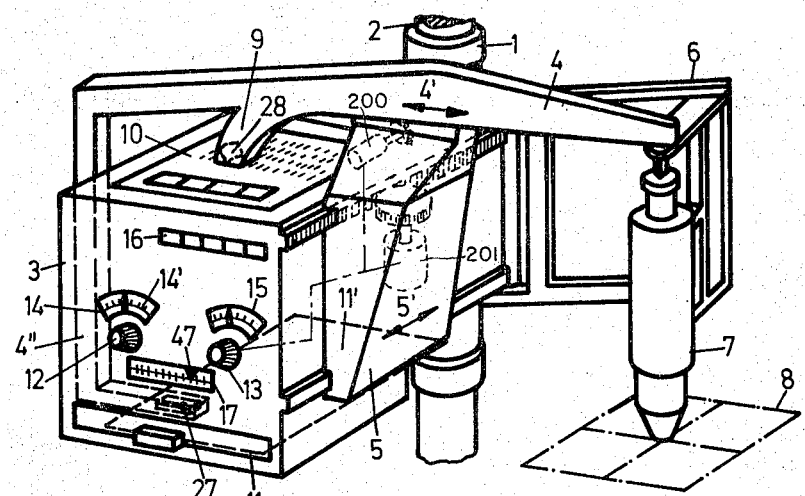
FIG. 1 is a perspective view of a scanner constructed in accordance with the principles of the present invention.
Figure 2:
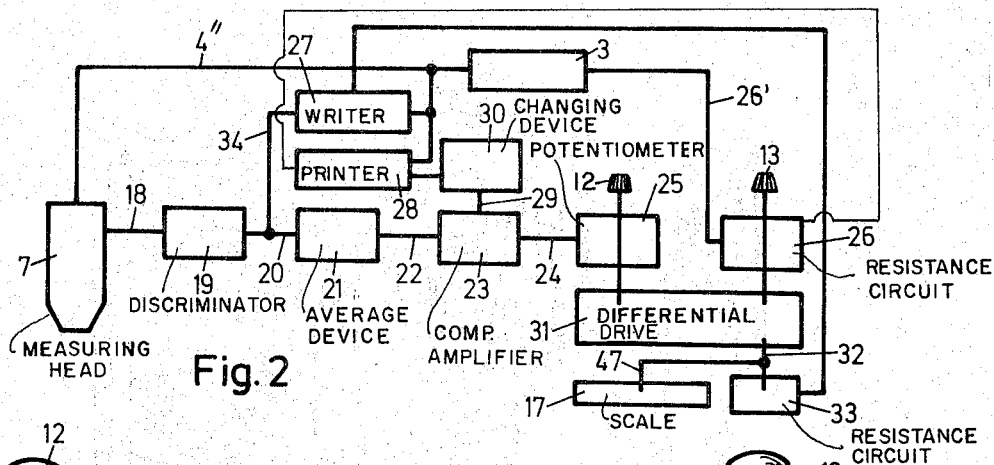
FIG. 2 is an electrical block diagram showing the important electrical connections.
Figure 4:
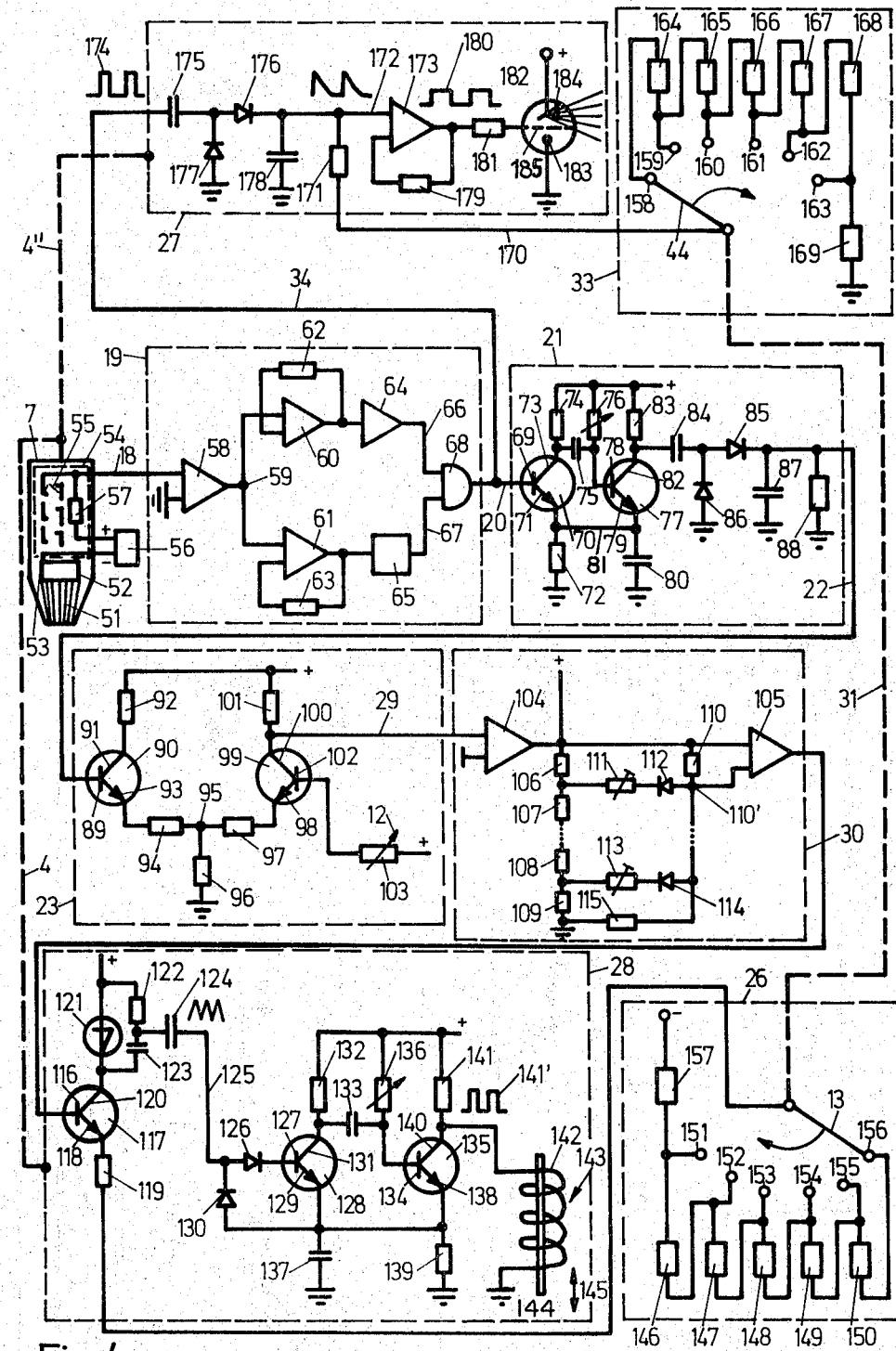
FIG. 4 shows the circuits in detail

FIG. 1 shows a box or casing 3 carrying a sleeve 1 which can be shifted along a column 2. The box 3 contains the electrical treating and switching members of the apparatus. The box 3 also contains a drive actuating an arm 4 and a transversely movable box 5. A measuring head 7 is connected with the box 3 by a scissorlike leverage 6 and is actuated by this drive to move while testing over the area 8 being examined. A motor 200 moves the measuring head 7 in the direction of the arrow 4'. It engages with a pinion a rack at the arm 4. The motor 201 engages with a pinion the upper guide at the box 3 shaped as a rack and serves for shifting the measuring head 7 in the direction of the arrow 5'. The part of the arm 4 which extends over the box 3 carries an extension 9 which contains a printer 28 providing a visible impression of results of measurements upon a writing sheet 10 removably mounted upon the upper surface of the box 3. The end 4'' of the arm 4 extending over the box 3 carries a holder extending into the lower portion of the box 3 and carrying a light-operated writer 27 for photographic reproductions of the results of measurements. The photographic reproduction takes place upon a light-sensitive sheet 11' located in a drawer 11 which is inserted into the lower part of the box 3. In FIGS. 2 and 4 the arm 4'' is indicated diagrammatically by a dashed line.

As is customary in scanners, the arm 4 is movable transversely in the directions of the arrow 4' and longitudinally in the directions of the arrow 5'.

The front plate of the box 3 carries two setting buttons 12 and 13 used for setting the values $n$ and $v$. This setting also takes place by pointers movable over the scales 14 and 15. A switch 16 shown diagrammatically above the scales is used to switch the apparatus on and off. A scale 17 is located under the buttons 12 and 13 and is used to indicate the average statistical compensation of the line distance as well as the quotient $n/v$. As shown in the block diagram of FIG. 2 which includes all the important parts of the present invention, rays emanating from the surface 8 being examined are transformed in the measuring head 7 depending upon their intensity into a series of impulses which are transmitted by a conductor 18 to a discriminator 19 which can be so set that it will transmit only those impulses the energy of which corresponds to those emanating from the used isotope. These selected impulses are transmiteed through the conductor 20 to a device 21 producing average values and containing several diode pumps which are connected in parallel and produce voltage corresponding logarithmically to the impulse rate. The logarithmic voltage value is transmitted through the conductor 22 to a compensation amplifier 23. The conpensated voltage is transmitted from the amplifier 23 through a conductor 24 to a potentiometer 25. The setting of the potentiometer 25 is effected by the button 12. The setting button 13 is turned angularly logarithmically and then it actuates a resistance circuit 26 to provide a linear adjustment of the testing speed $v$; this operates the movement of the measuring head 7, of the light-operated writer 27 and of the marking printer 28 while setting the maximum number of lines per millimeter. The speed of the motor drive is affected through the conductor 26' extending in the box 3 between the circuit 26 and the writer 27 and printer 28. The adjustment of lines produced by the printer depending upon the received impulse rate, takes place by the standarized voltage supplied through the conductor 29, which was transformed into a linear value in a device 30 changing logarithmic values into linear ones.

By operating the buttons 12 and 13 the values for $n$ and $v$ are transmitted to the differential drive 31. The drive 31 produces a logarithmic value for $n/v$ through the shaft 32. The logarithmic turning of the shaft 32 and the resistance circuit 33 connected with the shaft produce a linear value for $n/v$. This value is supplied to the light-actuated writer 27 for setting the duration of flashes. The actual release of flashes takes place by impulses of the measured values which are supplied by the conductor 34 and which pass through the discriminator 19, so that there is a flash for each impulse.

Figure 3:
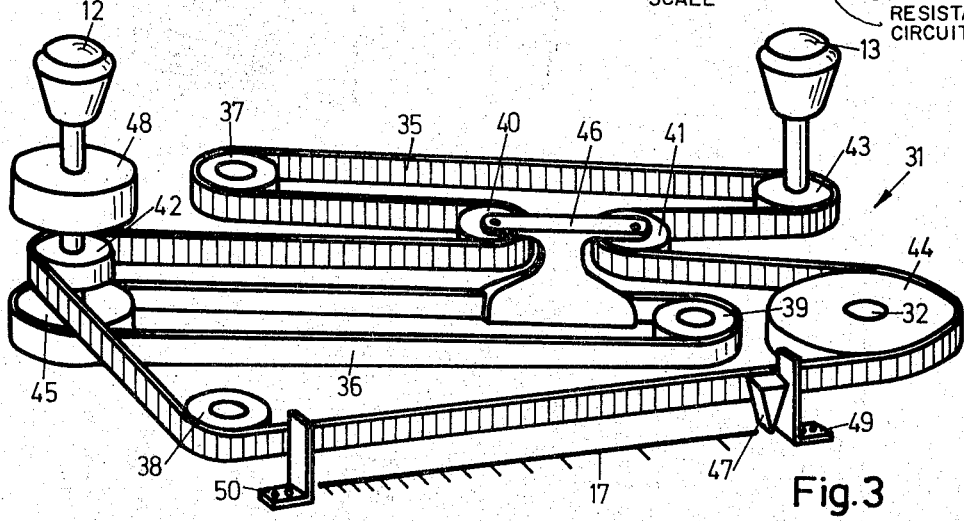
FIG. 3 is a perspective view of a belt-operated differential drive which automatically combines the set values.

As shown in FIG. 3, the differential drive 31 includes belts 35 and 36, rollers 37, 38, 39, 40, 41 and 42, driving wheels 43 and 45 and the starting wheel 44 connected with the shaft 32. The belt 35 extends over the rollers 37, 38, 40, 41, 42 and 44 and is driven by the wheel 43 which is connected with the button 13. The belt 36 extends over the rollers 39 and is driven by the wheel 45 which is connected with the button 12. The rollers 40 and 41 are rotatably mounted in a differential member 46 firmly connected with the belt 36.

The rotary button 12 is used to adjust the voltage corresponding to the impulse rate of $4 \times 10_2$ to $2 \times 10^5$ imp./min. which can be expected in medical examinations and which is received in the device 21 producing average values. The adjustment is so carried out that the maximum of the impulse rate is adapted to the maximum possible number of registerable indicia. This is carried out be determining the measured value appearing upon the scale 14 when the measuring head 7 is set upon the place from which emerge the maximum radiation and thus the impulse rate. Then the compensation voltage is adjusted until the pointer of the scale 14 is moved to the adjusting marking 14'. This adjustment is produced by turning the button 12 and thus regulating the potentiometer 25 until the pointer moves to the desired location. This produces the setting of the impulse rate in the compensation amplifier 23 to the range of adjusting voltage of 0.25 volt which is the best possible one for the apparatus. In the above indicated impulse rate which is to be expected in the medical-diagnostic field, the forwardly located switching elements of the rate meter, etc., produce measured voltages ranging between 0.25 volts to 0.75 volts, so that the desired result is always produced if the compensation voltage is limited to 0 up to 0.5 volts.

The button 13 is so shaped that it will not move when the button 12 is operated. By turning the button 12 the belt 36 is moved by the wheel 45, whereby the part of the belt 35 extending through the differential is moved over the wheel 44 and is also moved over the rollers 38, 42 and 40. The part of the belt 35 which extends over the wheel 45 remains immovable, since the button 13 is fixed. The movement of the front portion of the belt 35 causes a movement of the pointer 47 over the scale 17, so that the pointer will indicate the stationary compensation as well as the value for $n/v$. A setting of the button 12 by the openable lock 48 prevents it from being operated by the drive, so that once the button is set, it remains unchanged as a rule.

The rotation of the button 13 will set the testing speed in the fifteen steps indicated in the scale 15 at from 2 mm/sec. to 50 mm/sec. At the same time the writing frequency of the marking printer located in the casing extension 9 is adapted to the speed, so that three lines per millimeter are always imprinted at the maximum of the received impulse rates.

The belt 35 is moved by the rotation of the button 13 and, therefore, the wheel 44 with the shaft 32 will be also rotated, so that the setting of the testing speed will change the durations of flashes in the light printer. The stops 49 and 50 limit the adjustment of $n/v$ to a value of 3.3. When this value is exceeded, the statistical compensation becomes so great that the inscription does not produce a significant picture any more, due to variations in the line distance. If the indicator 47 will strike the stop 49, so that $n/v$ amountss to 3.3, the impulse rate $n$ which will be set at the button 12, will be smaller and thus would produce a greater statistical compensation; then the belt 35 is moved by the differential in such manner that the setting of the button 13 moves to the smaller speed values. At the set impulse rate $n$ and division by the set testing speed $v$, a quotient $n/v$ is produced which at most amounts to 3.3.

The complete circuit diagram shown in FIG. 4 is now described as follows:

At the bottom of the measuring head 7 there is an opening consisting of several channels, which may be designated as the collimator 51. Inside the head and next to the collimator there is a scintillation crystal 52 followed by the photocathode 53 of the multiplier 54 which contains the multiplying pressure plates 55 and which is operated by the source of current 56. The negative pole of the current source is connected to the cathode 53 while its positive pole is connected by the resistance 57 with the ends of the plates 55.

A signal produced in the measuring head 7 is transmitted by the conductor 18 to the linear amplifier 58 of the discriminator 19. The discriminator is connected to the amplifier 58 in that trigger amplifiers 60 adn 61 are connected symmetrically relatively to each other to a branch point 59, each of them being bridged by a feed back resistance 62 and 63. In one branch there is a reversing step amplifier 64 behind the amplifier 60 and in the other branch there is a delay member 65. Separate conductors 66 and 67 lead from the amplifier 64 as well as from the delay member 65 to the anticoincidence stage 68. A conductor 20 leads from the stage 68 to the device 21 forming the average value and there engages the base 69 of a transistor 70 the emitter 71 of which is connected by a resistance 72 to the ground and the collector 73 of which is connected by a resistance 74 to the plus pole of the current supply. The connection of the collector 73 with the resistance 74 is also connected by a condenser 75 and an adjustable resistance 76 with the conductor leading to the positive pole. Furthermore from this conductor a conductor is branched off between the condenser 75 and the adjustable resistance 76 which leads to the second transistor 77 and is connected to its base 78. The emitter 79 is connected, on the one hand, by the condenser 80 to the ground, and on the other is connected by a conductor 81 with the emitter 71 of the transistor 70. The collector 82 of the transistor 77 is connected by the resistance 83 to the plus pole. A conductor is branched off between the collector and the resistance 83 which carries a condenser 84 as well as a diode 85 directed away from the condenser. A conductor is directed to ground between the condenser 84 and the diode 85 and it contains a diode 86 closed to the ground. Two additional conductors extend to ground behind the diode 85, one of which carries a condenser 87 and the other a resistance 88. The conductor designated as 22 continues to the base 89 of the transistor 90 of the compensation amplifier 23. The collector 91 of the transistor 90 extends through a resistance 92 to the plus pole, while the emitter 93 is connected by a resistance 94 to a branch 95 which extends to the ground through a resistance 96. Another resistance 97 is connected with the branch 95 and is connected with the emitter 98 of a transistor 99 the collector 100 of which is connected with the plus pole by a resistance 101. The conductor 24 leads from the base 102 to an adjustable resistance 103. The conpensating amplifier 23 is connected by a conductor 29 to the value changer 30 (delogarithmic stage) and is connected there to an amplifier 104 which is connected by a direct conductor to a further amplifier 105. A branch is attached to the conductor between the two amplifiers; it consists of several resistances 106, 107, 108 and 109. Other resistances include a resistance 110 connected to a conductor between amplifiers 104 and 105. This resistance 110 is also connected with a conductor containing an adjustable resistance 111 and a diode 112 and joining the resistance 110 to the series row of resistances 106 to 109. This series connection of resistances 106 to 109 is also connecteed to an adjustable resistance 113 and a diode 114. While the resistance 109 is connected to the ground, prior to this connection it is connected to the resistance 110 through a further resistance 115. The outlet of the amplifier 105 is directly connected with the printer 28 and is joined there to the base 116 of a transistor 117 the emitter 118 of which is connected by a resistance 119 with the resistance circuit 26. The collector 120 of the transistor 117 is connected by a further conductor which contains a four layer diode 121 with the plus pole. The diode 121 is bridged by a resistance 122 and a condenser 123. Between these elements there is a connection to a further condenser 124. The impulse current obtained from the condenser 124 is transmitted by a conductor 125 and a diode 126 which is connected to the base 127 of a transistor 128. A further conductor branches off from the diode 126 and extends to the emitter 129 of the transistor 128; this conductor contains a diode 130. The collector 131 has a connection to the plus pole which includes a resistance 132. A branch line provided between the collector 131 and the resistance 132 includes a condenser 133 and leads to the base 134 of a transistor 135. Furthermore a conductor branches off from this connection to the positive pole and includes an adjustable resistance 136. Another connection extends between the emitter of the transistor 128 and the ground includes a condenser 137. The emitter 138 of the transistor 135 is connected with ground by a resistance 139. The collector 140 is connected to the plus pole by a resistance 141. An impulse current designated in FIG. 4 by the numeral 141' is removed from the device between the resistance 141 and the collector 140 and is supplied to the coil 142 of the actual writer 143 containing the stylus 144 with which the actual indicia are inscribed and which moves in the direction of the double arrow 145.

The resistance circuit 26 consists of resistances 146 to 150 connected with contacts 151 and 156 which can be actuated by the setting button 13. The contact 151 is in direct connection with the negative pole through the resistance 157. Furthermore, the setting button 13 is mechanically connected by the device 31 with the starting wheel 44 which can actuate the contacts 158 to 163 with which the resistances 164 to 169 are connected. The second connection of the resistance 169 is to the ground. Electrical connection to the contacts of the starting wheel 44 is connected by the conductor 170 with the resistance 171 the other end of which is connected with the conductor 172 of the amplifier 173 of the light writer. On the other hand, the light writer is connected by the conductor 34 with the connecting conductor 20 between the discriminator 19 and the device 21 forming the middle value. The impulse sequence which is symbolically indicated by 174 in FIG. 4, moves into the condenser 175 in the light writer 27; the condenser 175 is connected with a diode 176 extending in the incoming direction. A connection leading to ground is provided between the condenser 175 and the diode 176. This connection has a diode 177, the locking direction of which is directed to the conductor. After the diode there is a further connection to ground in which the condenser 178 is located. The amplifier 173 is bridged by a resistance 179 so that it is left by increased impulses (indicated by 180) which then reach through a resistance 181 an electrical tube 182 having a cathode 183 connected to the ground and an anode 184 connected to the plus pole, while the resistance lies at the grid.

The following is a complete description of the operation of the apparatus based on the complete diagram of FIG. 4.

A signal appearing at the resistance 57 at the end of the plates 55 of the multiplier 54 is transmitted to the linear multiplier 58. The discriminator 19 is connected thereto; it includes the symmetrically arranged trigger amplifiers 60 and 61 each of which has a feed back 62 and 63. Behind the trigger stage 60 with its feed back 62 there is the reversing stage 64 and behind the trigger stage 61 with tis feed back 63 there is the delay device 65. A conductor leads from the member 64 as well as the member 65 to the anti-coincidence stage 68. This stage 68 allows the passage of a signal only when one signal comes from either the conductor 66 or the conductor 67. The device is so set that one conductor has an upper limit and the other conductor has a lower limit. When a signal arrives which is smaller than the lower limit the signal is not allowed to pass. If the signal is greater than the lower limit but is smaller than the upper limit, one signal arrives and is passed through the anti-coincidence stage 68. If, however, a signal arrives which is greater than the upper limit, then two signals are transmitted, namely, in the positive direction at the stage 61 and in the negative direction at the stage 60 due to the reversing stage 64. These signals compensate each other, so that no signal is allowed to pass through the stage 68 which constitutes a UND member. Thus the passed signals can be selected by the selection of upper and lower limits.

Impulses which were allowed to pass between the stages 60 and 61 are transmitted from the anti-coincidence stage through the conductor 20 to the device 21 forming the average value. There they pass into the monostable (one shot) multivibrator consittuted by the two transistors 70 and 77 with their switch connections. The impulse length thus produced can be adjusted by the regulatable resistance 76. The outgoing impulse is coupled out through the charging condenser 84 and is transmitted to the integration capacity 87 through the diode pump 85, 86. The resistance 88 serves as the discharge resistance of the capacity 87. The device 84 to 88 constitutes a ratemeter which in the described embodiment has a logarithmic indicating line.

The signal is then transmitted through the conductor 22 to the compensation amplifier 23 which is also a differential amplifier due to the connection of transistors 90 and 99. The coupling of the signal takes place over the network 94, 96 and 97. The voltage to be removed can be set at the adjusting potentiometer 103 by the button 12. The device 23 carries out a measuring range setting, so that the scale 14 always has the entire available measuring range.

The compensating amplifier 23 is connected by a conductor 29 with the delogarithmic stage 30. The delogarithmic stage 30 includes a non-invertable amplifier 104 serving for coupling to the differential amplifier 105. The connection between these two amplifiers 104 and 105 includes a functional generator with transverse branches 111, 112 and 113, 114 lying upon one side of a fixed voltage divider 106, 109. If voltage at the outlet 104 is increased, then initially the potential of the point 110' is changed corresponding to the voltage division 115 and 110. With further increase in voltage the potential of the transverse branch 113, 114 is reached and the diode 114 switches on the resistance 113 parallel to the resistance 115. Then the potential at the point 110' runs up to reaching the potential of the following transverse branch, which then as 113, 114 is switched parallel to the ratio 110 and 113. With further increase in voltage other branches are switched on in parallel which are not shown in the drawing, for example, specifically five, including 113, 114 and 111, 112, so that the drop in voltage at the resistance 110 does not follow the outlet voltage at 104 linearly, but approximately in secants. The drop in voltage at the resistance 110 is the inlet voltage at the differential amplifier 105. The device 30 serves to make linear the logarithmic run of the voltage which is supplied by the ratemeter 21 and the differential amplifier 23, in that the resistances 111–113 are set correspondingly.

The outlet of the amplifier 105 is connected directly with the printer 28. There the actuation of the base 116 of the transistor 117 makes it conductive and supplies the capacity 123 through the emitter 119 and in series connected circuit 26. After the four layer diode 121 has reached its breakthrought voltage, it becomes conductive and discharges the capacity 123 over the resistance 122. The discharge impulse which is then produced at the resistance 122 is coupled out through the condenser 124. The current through the transistor 117 determines then the charging time period for the capacity 123 and thus the frequency of the dishcarge impulses. A saw tooth voltage is the produced in the collector 120. The current through the transistor 117 and thus the impulse frequency are determined by the voltage at the base 116 depending upon the setting of the potentiometer 103. In addition the current or the frequency for switching on and off additional emitter resistances (146 to 150 of 26) is changed when the scanning speed is varied. Thus a constant line thickness is maintained even when the scanning speed is changed. The transistors 128 and 135 with their switch connections provide a monostable (one shot) multivibrator the length of the outgoing impulses of which can be influenced by the setting of the resistance 136. The outlet is connected with the winding 142 of the magnet, so that the stylus 144 is moved for printing. The circuit 26 icludes the emitter resistances for the transistor 117 which can be switched on and off and which are generally indicated as 146 to 150.

A second inscribing possibility is provided by the arrangement of the light writer 27. Then the impulses coupled by the charging condenser 175 are introduced through the diode pump 176, 177 into the integration condenser 178 and charge it in a very short time to the full voltage. When the impulse at the outlet of the capacity 175 goes back toward zero, the diode 176 moves to locking and prevents a discharge of the capacity 178. The discharge takes place through the resistance 171 to which are selectively switched on a number of resistances 164 to 169 depending upon the location of the switch 44. This produces a discharge time for the capacity 178 which is dependant upon the position of the switch 44. The amplifier 173 with its feedback 179 constitutes a so-called Schmitt-trigger which has a firmly fixed limit. When an impulse at 172 exceeds its voltage limit, the oultet changes potential until the voltage at the inlet has dropped below the limit. Thus an outlet impulse is produced during the impulse operation the length of which is directly dependant upon the discharge time period of the capacity 178. Then the length of the impulse at the outlet of the amplifier 173 is determined by the wheel 44. The outgoing impulse is supplied by the resistance 181 to the grid 185 of the light triode 182. This produces light impulses. This makes certain that when the apparatus is set to different impulse rates and/or to different scanning speeds the amount of light illuminating the film will be always constant.

We claim:

1. An apparatus for determining the distribution of radioactive substances in a body, comprising a radioactive substance measuring head, means for moving the measuring head for a line-wise scanning of said body, impulse producing means connected with said head, means for producing a synchronous movement of the measuring head and a light actuated writer for the distribution of radioactive substances, adjusting means for adjusting the impulse rate of $n$ of the impulse producing means, adjusting means for adjusting the scanning speed $v$ of the measuring head, a calculating means interconnecting the two adjusting means and providing the quotient $n/v$, a setting means for setting the flash duration of said writer connected with said interconnecting means and said writer for setting flash duration corresponding to the quotient $n/v$, and an electrical circuit means connecting said writer with said impulse producing means.

2. An apparatus in accordance with claim 1, wherein the calculating means comprises a differential drive with two rollers which are connected with the adjusting means for the impulse rate $n$ and the testing speed $v$ and a driven shaft producing the quotient $n/v$, which is coupled with said rollers, a potentiometer connected with said means for adjusting the impulse rate $n$ for setting the compensation voltage and compensation amplifier connected with said potentiometer, a resistance circuit connected with said means for adjusting the testing speed $v$, said resistance circuit being linearly influenced during logarithmic setting of the testing speed $v$, a shaft connected with said means for adjusting the testing speed $v$ and adapted to be turned to an angle corresponding to the logarithm of the quotient $n/v$, and a resistance circuit connected with the last-mentioned shaft and producing a voltage changing the flash duration linearly with the value $n/v$.

3. An apparatus in accordance with claim 2, wherein said differential drive comprises two closed belts, rollers supporting one of said belts, rollers supporting the other one of said belts, said means for adjusting the impulse rate $n$ driving said one belt, said means for adjustng the testing speed $v$ driving said other belt, a differentiall member firmly connected with said other belt, two of the first-mentioned rollers being included in said differential member, one of the second mentioned rollers being mounted upon the last-mentioned shaft.

* * * * *